(12) United States Patent
Schluter (10) Patent No.: US 12,180,987 B2
(45) Date of Patent: Dec. 31, 2024

(54) PROFILE SYSTEM FOR INTERSECTING JOINTS

(71) Applicant: Schluter Systems, LP, Plattsburgh, NY (US)

(72) Inventor: Werner Schluter, Iserlohn (DE)

(73) Assignee: Schluter Systems L.P., Plattsburgh, NY (US)

( * ) Notice: Subject to any disclaimer, the term of this patent is extended or adjusted under 35 U.S.C. 154(b) by 259 days.

(21) Appl. No.: 17/319,588

(22) Filed: May 13, 2021

(65) Prior Publication Data
US 2022/0243747 A1    Aug. 4, 2022

(51) Int. Cl.
*F16B 2/04*    (2006.01)

(52) U.S. Cl.
CPC ..................... *F16B 2/04* (2013.01)

(58) Field of Classification Search
CPC . A47B 47/0016; A47B 2230/04; E04F 13/06; F16B 2/04
See application file for complete search history.

(56) References Cited

U.S. PATENT DOCUMENTS

| | | |
|---|---|---|
| 2,230,688 A | 2/1941 | Irwin |
| 2,843,889 A | 7/1958 | Keller |
| 3,213,584 A | 10/1965 | Bush |
| 3,396,640 A | 8/1968 | Fujihara |
| 3,582,095 A | 6/1971 | Bogaert |
| 3,598,026 A | 8/1971 | Johnson |
| 3,646,716 A | 3/1972 | Jenner |
| 3,682,053 A | 8/1972 | Kerschner |
| 3,704,564 A | 12/1972 | Koga |
| 3,759,623 A | 9/1973 | Hesse |
| 3,797,188 A | 3/1974 | Mansfeld |
| 3,827,204 A | 8/1974 | Walters |

(Continued)

FOREIGN PATENT DOCUMENTS

| | | |
|---|---|---|
| AU | 8934730 A | 1/1991 |
| DE | 7801755 U1 | 5/1978 |

(Continued)

OTHER PUBLICATIONS

International Search Report for European Application No. 21210442.6-1015, dated Apr. 14, 2022.

(Continued)

*Primary Examiner* — Matthew R McMahon
(74) *Attorney, Agent, or Firm* — Thorpe North & Western; Jason R. Jones (57) ABSTRACT

A profile system includes a series of elongate profiles (1) and one or more intermediate and/or end elements (8; 28). A series of connecting pins (14) each are a separate part having two end portions (15, 16) and being designed to releasably connect a profile (1) on the face side with an intermediate and/or with an end element (8; 28). The profile cross sections form on their face side receiving openings (5) for receiving the first end portion (15) of a connecting pin (14). The intermediate and/or end elements (8; 28) comprise receiving holes (13) for receiving the second end portion (16) of a connecting pin (14). The receiving openings (13) of the intermediate and/or end elements (8; 28) each extend through a wall into a cavity of the intermediate and/or end element (8; 28).

21 Claims, 5 Drawing Sheets

(56) References Cited

U.S. PATENT DOCUMENTS

| | | | |
|---|---|---|---|
| 3,838,931 A | 10/1974 | Valla | |
| 3,868,802 A | 3/1975 | Schubach | |
| 3,974,614 A | 8/1976 | Strong | |
| 4,050,206 A | 9/1977 | Utsuyama | |
| 4,346,542 A | 8/1982 | Tateno | |
| 4,359,847 A | 11/1982 | Schukolinski | |
| 4,360,992 A | 11/1982 | Marino | |
| 4,454,699 A * | 6/1984 | Strobl | F16B 21/082 411/510 |
| 4,468,910 A | 9/1984 | Morrison | |
| 4,484,407 A * | 11/1984 | Petersson | A63H 33/102 403/292 |
| 4,564,550 A | 1/1986 | Tschudin-Mahrer | |
| 4,610,561 A * | 9/1986 | Cecchellero | F16B 7/185 403/171 |
| 4,651,488 A | 3/1987 | Nicholas et al. | |
| 4,678,359 A * | 7/1987 | Keen | A47B 47/0008 403/403 |
| 4,793,162 A | 12/1988 | Emmons | |
| 4,861,043 A | 8/1989 | Anderson et al. | |
| 5,078,529 A | 1/1992 | Moulton | |
| 5,121,579 A | 6/1992 | Hamar et al. | |
| 5,148,644 A | 9/1992 | Weir | |
| 5,181,357 A | 1/1993 | Pourtau et al. | |
| 5,238,721 A | 8/1993 | Nakazawa | |
| 5,263,294 A | 11/1993 | Koenig et al. | |
| 5,289,663 A | 3/1994 | Schluter | |
| 5,657,598 A | 8/1997 | Wilbs et al. | |
| 5,666,775 A | 9/1997 | Shreiner et al. | |
| 5,791,111 A | 8/1998 | Beenders | |
| 5,806,270 A | 9/1998 | Solano et al. | |
| 5,990,377 A | 11/1999 | Chen et al. | |
| 6,052,960 A | 4/2000 | Yonemura | |
| 6,062,664 A * | 5/2000 | Benner | H02B 1/301 403/231 |
| 6,305,892 B1 * | 10/2001 | Qiao | F16B 21/082 411/510 |
| 6,332,657 B1 * | 12/2001 | Fischer | A47B 47/005 403/217 |
| 6,449,911 B1 | 9/2002 | Hudson | |
| 6,484,462 B2 | 11/2002 | Shreiner et al. | |
| 6,523,986 B1 | 2/2003 | Hoffmann | |
| 6,591,575 B2 | 7/2003 | Benedettini | |
| 6,737,150 B2 | 5/2004 | Zahler et al. | |
| 6,751,919 B2 | 6/2004 | Calixto | |
| 6,948,287 B2 | 9/2005 | Korn | |
| 7,197,855 B2 | 4/2007 | Della Pepa | |
| 7,377,823 B2 * | 5/2008 | Chen | H01R 12/585 439/82 |
| 7,827,750 B2 | 11/2010 | Sondermann | |
| 7,954,298 B2 | 6/2011 | Jilg et al. | |
| 8,024,902 B2 | 9/2011 | Wedi | |
| 8,146,313 B2 | 4/2012 | Proot et al. | |
| 8,161,708 B2 | 4/2012 | Schacht et al. | |
| 8,403,431 B2 * | 3/2013 | Elkins | H04Q 1/11 312/265.3 |
| 8,551,594 B2 | 10/2013 | Deiss | |
| 8,769,883 B2 | 7/2014 | Bazzarini et al. | |
| 8,820,002 B2 | 9/2014 | Hunt et al. | |
| 8,959,860 B2 | 2/2015 | Wierzbowski | |
| 8,959,872 B2 | 2/2015 | Ayres et al. | |
| 8,978,334 B2 | 3/2015 | Engstrom | |
| 9,004,715 B1 * | 4/2015 | Litke | A47F 3/001 362/218 |
| 9,290,949 B2 | 3/2016 | Choy | |
| 9,321,493 B2 * | 4/2016 | Dost | B60R 9/065 |
| 9,482,010 B2 | 11/2016 | Kartler | |
| 9,494,235 B2 | 11/2016 | Winslow et al. | |
| 9,597,832 B2 | 3/2017 | Deiss | |
| 9,636,892 B2 | 5/2017 | Albert et al. | |
| 9,783,999 B2 | 10/2017 | Amundson | |
| 9,850,668 B2 | 12/2017 | Della Pepa | |
| 9,908,965 B2 | 3/2018 | Sauttreau et al. | |
| 9,956,723 B2 | 5/2018 | Kodera et al. | |
| 10,100,514 B2 | 10/2018 | Klein et al. | |
| 10,202,777 B1 | 2/2019 | Leavey | |
| 10,450,762 B2 * | 10/2019 | Schluter | E04F 19/061 |
| 10,487,518 B2 | 11/2019 | Anzalone, Jr. | |
| 10,563,360 B2 | 2/2020 | Bang et al. | |
| 10,683,660 B2 * | 6/2020 | Preston | E04B 1/6801 |
| 10,723,110 B2 | 7/2020 | Ober et al. | |
| 10,760,283 B2 | 9/2020 | Carrubba | |
| 10,851,541 B2 | 12/2020 | Robinson | |
| 10,935,138 B2 | 3/2021 | Fina Segura | |
| 11,091,908 B2 | 8/2021 | Paetow et al. | |
| 11,103,109 B2 * | 8/2021 | Schluter | A47K 10/10 |
| 11,180,915 B2 | 11/2021 | Richardson et al. | |
| 11,384,545 B2 * | 7/2022 | Schluter | E04F 19/061 |
| 11,603,877 B1 * | 3/2023 | Cosgrove | F16B 13/02 |
| 11,608,850 B2 * | 3/2023 | von Wilcke | F16B 12/24 |
| 11,781,043 B2 | 10/2023 | Ackermann et al. | |
| 11,785,727 B2 * | 10/2023 | Löwen | G06F 1/185 174/559 |
| 2002/0189190 A1 | 12/2002 | Charmat et al. | |
| 2003/0051426 A1 | 3/2003 | Kornfalt | |
| 2003/0074851 A1 | 4/2003 | Charmat et al. | |
| 2003/0154662 A1 | 8/2003 | Bruchu et al. | |
| 2004/0106346 A1 | 6/2004 | Zafiroglu | |
| 2005/0158354 A1 | 7/2005 | Hannay et al. | |
| 2008/0034691 A1 | 2/2008 | Nelson | |
| 2008/0083179 A1 | 4/2008 | Riggs | |
| 2008/0086808 A1 | 4/2008 | Sutton et al. | |
| 2008/0229682 A1 | 9/2008 | Torsani | |
| 2008/0263983 A1 | 10/2008 | Stanchfield et al. | |
| 2009/0205278 A1 | 8/2009 | Lynch et al. | |
| 2010/0218444 A1 | 9/2010 | Wambaug | |
| 2014/0057066 A1 | 2/2014 | Cai | |
| 2015/0240503 A1 | 8/2015 | Scurto | |
| 2017/0071415 A1 | 3/2017 | Rosko | |
| 2017/0362819 A1 | 12/2017 | Sondermann | |
| 2018/0251265 A1 * | 9/2018 | Egertz | B65D 90/08 |
| 2018/0334813 A1 | 11/2018 | Schluter | |
| 2019/0077124 A1 | 3/2019 | Shinbara | |
| 2019/0225849 A1 | 7/2019 | Bollström et al. | |
| 2022/0010548 A1 * | 1/2022 | Schluter | E04F 19/065 |
| 2023/0007790 A1 * | 1/2023 | Löwen | H05K 5/006 |

FOREIGN PATENT DOCUMENTS

| | | | | |
|---|---|---|---|---|
| DE | 2838664 A1 * | 5/1980 | | A47B 47/0016 |
| DE | 3401032 A1 | 7/1985 | | |
| DE | 3405571 A1 * | 8/1985 | | F16B 12/2063 |
| DE | 3407075 A1 | 9/1985 | | |
| DE | 3429860 A | 3/1986 | | |
| DE | 9200696 U1 | 4/1992 | | |
| DE | 19800554 A1 | 7/1999 | | |
| DE | 102009050698 A1 | 4/2011 | | |
| DE | 202011110083 U1 | 1/2013 | | |
| DE | 102014114909 A1 | 10/2014 | | |
| DE | 202017107404 U1 | 1/2018 | | |
| DE | 202020005046 U1 | 4/2021 | | |
| EP | 0344120 A1 * | 11/1989 | | A47B 47/0016 |
| EP | 0843103 A2 * | 5/1998 | | A47B 47/0008 |
| EP | 1152100 A1 | 11/2001 | | |
| EP | 3854963 B1 | 6/2022 | | |
| FR | 2262217 A1 * | 9/1975 | | A47B 47/0016 |
| FR | 2576942 A1 | 8/1986 | | |
| GB | 191417164 A | 12/1914 | | |
| JP | H05321916 A * | 12/1993 | | |
| JP | 2003269423 A * | 9/2003 | | |
| KR | 20170137351 A | 12/2017 | | |
| WO | WO-9000684 A * | 1/1990 | | A47B 47/045 |
| WO | WO 92/01843 A | 2/1992 | | |
| WO | WO 2006/114458 A1 | 11/2006 | | |

OTHER PUBLICATIONS

International Search Report for German Application No. 20 2021 100 478.9, dated Oct. 21, 2021.

* cited by examiner

PROFILE SYSTEM FOR INTERSECTING JOINTS

PRIORITY CLAIM

Priority is claimed of and to German Patent Application Serial No. 20 2021 100 478.9, filed Feb. 1, 2021, which is hereby incorporated herein by reference in its entirety.

BACKGROUND OF THE INVENTION

Field of the Invention

The present invention relates to a profile system for use in intersecting joints where two or more planes of veneer material meet.

SUMMARY OF THE INVENTION

In accordance with one aspect of the technology, a profile system is provided, a series of elongate profiles (1), which can have a substantially constant cross-section over their length. One or more intermediate and/or end elements (8; 28) can be designed to be arranged between profiles (1) or to close the face side of a profile (1). Connecting pins (14) can each be a separate part having two end portions (15, 16) and being designed to releasably connect a profile (1) on the face side with an intermediate and/or with an end element (8; 28). The profile cross sections can form on their face side receiving openings (5) for receiving the first end portion (15) of a connecting pin (14). The intermediate and/or end elements (8; 28) can comprise receiving holes (13) for receiving the second end portion (16) of a connecting pin (14). The receiving openings (13) of the intermediate and/or end elements (8; 28) can each extend through a wall into a cavity of the intermediate and/or end element (8; 28). The first end portion (15) of the connecting pins (14) can include a radially outwardly domed clamping section (17) of maximum diameter. The clamping section (17) can be provided with at least one elongate recess (18) extending in longitudinal direction of the connecting pin (14) and radially through the connecting pin (14). The dimensions of the clamping section (17) can be adapted to the dimensions of the receiving openings (5) in such a manner that the clamping section (17) can be inserted into a receiving opening (5) while producing a positive and frictional connection. The second end portion (16) can include a receiving section (23) having an annular indentation (22). The dimensions of the receiving section (23) can be adapted to the dimensions of the receiving holes (13) in such a manner that the receiving sections (23) at least positively receive the wall surrounding a receiving hole (13) of an intermediate and/or end element (8; 28).

In accordance with another aspect of the technology, a profile system is provided, including a series of elongate profiles (1), which can have a substantially constant cross-section over their length. One or more intermediate and/or end elements (8; 28) can be designed to be arranged between profiles (1) or to close the face side of a profile (1). Connecting pins (14) can each be a separate part having two end portions (15, 16) and can be designed to releasably connect a profile (1) on the face side with an intermediate and/or with an end element (8; 28). The connecting pins can be fittable within receiving openings and/or holes carried by the profile and/or intermediate and/or end elements.

BRIEF DESCRIPTION OF THE DRAWINGS

FIG. 6 is a perspective exploded view of the components shown in FIGS. 1 to 5 during their assembly;

The same reference numbers relate hereafter to identical or similar components or component ranges.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Definitions

As used herein, the singular forms "a" and "the" can include plural referents unless the context clearly dictates otherwise. Thus, for example, reference to "a profile" can include one or more of such pieces, if the context dictates.

As used herein, the term "substantially" refers to the complete or nearly complete extent or degree of an action, characteristic, property, state, structure, item, or result. As an arbitrary example, an object that is "substantially" enclosed is an article that is either completely enclosed or nearly completely enclosed. The exact allowable degree of deviation from absolute completeness may in some cases depend upon the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. As another arbitrary example, a composition that is "substantially free of" an ingredient or element may still actually contain such item so long as there is no measurable effect as a result thereof.

As used herein, the term "about" is used to provide flexibility to a numerical range endpoint by providing that a given value may be "a little above" or "a little below" the endpoint.

Relative directional terms can sometimes be used herein to describe and claim various components of the present invention. Such terms include, without limitation, "upward," "downward," "horizontal," "vertical," etc. These terms are generally not intended to be limiting, but are used to most clearly describe and claim the various features of the invention. Where such terms must carry some limitation, they are intended to be limited to usage commonly known and understood by those of ordinary skill in the art in the context of this disclosure. Generally, directional terms used in this application, such as "top" or "bottom" refer to the installed state. The formulations "substantially vertical" and "substantially horizontal" are to be construed such that the main extension direction is vertical and horizontal, respectively.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Invention

The present technology relates to profile systems which have a constant cross-section over their length, and intermediate and/or end elements which are designed to be arranged between profiles or to terminate a profile at the end face.

Profile systems of this type are known in the state of the art in a wide variety of designs. The intermediate and/or drainage elements are normally designed with one or more outwardly projecting connecting sections which can be inserted into the cross-section of a profile at its end face. The fastening of an intermediate and/or end element can then follow, for example, using an adhesive. Variants are also known in which the dimensions of the outer contours of the connecting sections of the intermediate and/or end elements are adapted to the inner contour of the cross-section of the profiles in such a way that the connecting sections can be inserted into the profiles with frictional engagement under the application of pressure. The latter variant, however, requires low tolerances, which makes the production of both the profiles and the intermediate and/or end elements considerably more difficult and expensive.

In light of these considerations, it is an object of the present invention to create a system of the above-mentioned type, with which the intermediate and/or end elements can be fastened securely and detachably to the end faces of the profiles.

One of the manners in which the present technology addresses these issues provides a system comprising elongate profiles, which have a constant cross-section over their length, intermediate and/or end elements, which are designed to be arranged between profiles or to close the face side of a profile, and connecting pins, wherein each connecting pin is a separate part having two end portions and being designed to releasably connect a profile on the face side with an intermediate and/or with an end element, wherein the profile cross sections form on their face side receiving openings for receiving the first end portion of a connecting pin, wherein the intermediate and/or end elements comprise receiving holes for receiving the second end portion of a connecting pin, wherein the receiving openings of the intermediate and/or end elements each extend through a wall into a cavity of the intermediate and/or end element, wherein the first end portion of the connecting pins comprises a radially outwardly domed clamping section of maximum diameter, said clamping section being provided with at least one elongate recess extending in longitudinal direction of the connecting pin and radially through the connecting pin, wherein the dimensions of the clamping section are adapted to the dimensions of the receiving openings in such a manner that the clamping section can be inserted into a receiving opening while producing a positive and frictional connection, and wherein the second end portion comprises a receiving section having an annular indentation, wherein the dimensions of the receiving section are adapted to the dimensions of the receiving holes in such a manner that the receiving sections at least positively receive the wall surrounding a receiving hole of an intermediate and/or end element.

An advantage of the system according to the present technology is that the individual components can be manufactured easily and inexpensively due to tolerance ranges which are not too small. A connecting pin is fixed to a profile by means of the radially outwardly domed clamping section of the first end portion of a connecting pin, the outer diameter of which is compressed when it is inserted into a receiving opening of the profile, thereby simultaneously producing a positive and frictional connection. The elasticity required to compress the outer diameter of the clamping section is provided by the recess in the clamping section. The connection of a connecting pin to an intermediate and/or terminating element is made via the receiving section of the second end portion of the connecting pin, which is provided with the annular indentation. If the free end of the second end portion is inserted into a receiving hole of an intermediate and/or terminating element with pressure, an at least positive connection is achieved as soon as the outer wall of the intermediate and/or terminating element surrounding the corresponding receiving hole snaps or engages into the annular indentation of the receiving section. Overall, the components of the system according to the invention can be assembled quickly and easily, resulting in very good manageability. At the same time, a very reliable yet releasable connection is provided between the individual components.

The diameter of the first end portion of the connecting pins can reduce from the clamping section towards the free end, creating a particularly conical insertion section that significantly facilitates insertion of the free end of the first end portion into a receiving opening of a profile.

The first end portion of the connecting pins can advantageously comprise a support section being arranged next to the clamping section and facing towards the second end portion, wherein the support section is provided with support projections and said support projections being spaced apart from each other in circumferential direction and protrude radially outwards. The dimensions of the support projections are advantageously selected in such a way that, when the first end portion is inserted into a corresponding receiving opening of a profile, the projections bear against the profile in order to achieve a form fit here as well. The outer diameter of the first end portion in the area of the support projections advantageously corresponds to the diameter of the receiving openings or is slightly larger. The latter variant is particularly preferable if the material of the connecting pins is significantly softer or significantly harder than the material of the profiles, so that the supporting projections are either compressed due to the material or press into the material of the profiles. The support projections are in particular elongated and extend in the longitudinal direction of the connecting pin.

According to one embodiment of the present invention, the support section of the first end portion is arranged directly next to the receiving section of the second end portion.

Advantageously, the diameter of the second end portion of the connecting pins can reduce from the receiving section towards the free end so that there is also a particularly conical insertion section at the end of the second end portion which facilitates insertion of the second end portion into a receiving hole of an intermediate and/or drain element.

According to one embodiment of the present invention, the second end portion of the connecting pins comprises a groove, said groove extending from the free end of the second end portion in longitudinal direction of the connecting pin and radially therethrough. A groove formed in this way enables the outer diameter of the second end portion to be compressed when it is inserted into a corresponding receiving hole of an intermediate and/or terminating element, which simplifies the production of the snap-on connection described above.

Advantageously, the groove can extend through the entire second end portion of the connecting pins, which ensures very good flexibility.

The connecting pins can be made of plastic material, for example of ABS or acrylonitrile butadiene styrene, of PC or polycarbonate or the like.

The connecting pins can be manufactured as injection molded parts.

The dimensions of the visible surfaces of the profiles and the dimensions of the visible surfaces of the intermediate and/or end elements can be matched to one another in such a manner that they merge flush with one another in the connected state, thus achieving a visually attractive appearance.

The cross sections of the profiles can advantageously each be provided on the face side with two receiving openings, and that the intermediate and/or end elements are each provided with two correspondingly positioned receiving holes on at least one wall. In this manner, a profile can be connected to an intermediate and/or end element using two connecting pins, thereby providing an anti-rotation device. Thus, proper relative positioning of the components is always ensured.

The profile and the intermediate and/or end elements can be made of the same material, which results in a uniform appearance.

The profiles can be tile end profiles, profiles accommodating lighting means or cable duct profiles. The term "profiles accommodating lighting means" refers in particular to profiles to which LED strips and, where appropriate, diffusion screens are attached.

Further features and advantages of the present invention will become apparent from the following description of systems according to embodiments of the present invention with reference to the accompanying drawing. Hereinafter, same reference numbers refer to same or similar components or component areas.

Figure 1:
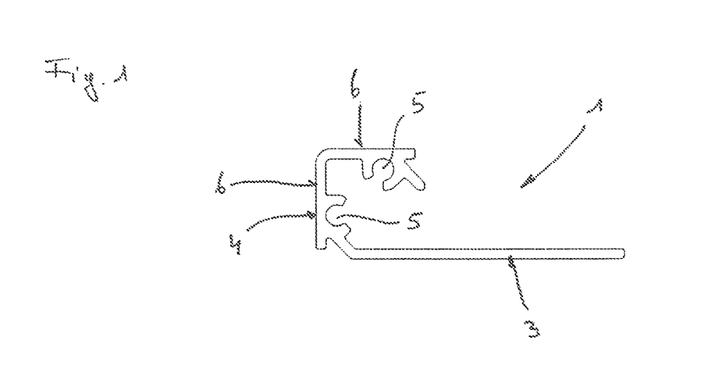
FIG. 1 is an end view of a profile according to a first embodiment of the present invention.

FIG. 1 shows a profile 1, which in this case is a tile end profile. It can be made of stainless steel, aluminum or plastic. The profile 1 comprises a fastening section 3 provided with punched holes 2, by means of which the profile 1 is fixed to a substrate, and a contact section 4, against which end faces of tiles laid on the fastening section 3 rest and which forms two visible surfaces 6. Apart from the punched holes 2, the profile 1, which is designed as an extruded profile, has a constant cross-section over its length and is provided with two receiving openings 5 at the end face. The shape of the receiving openings 5 corresponds in this case to that of a circular segment extending over more than 180°.

Figure 2:
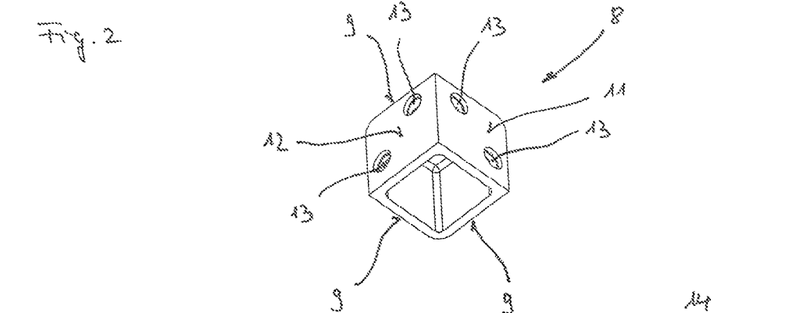
FIG. 2 is a perspective view of an intermediate element according to one embodiment of the present invention.

FIG. 2 shows an intermediate element 8, which is essentially designed as a hollow cube with an open underside, wherein three surfaces form visible surfaces 9. The dimensions of the visible surfaces 9 of the intermediate element 8 are adapted to the dimensions of the visible surfaces 6 of the profile 1 in such a manner that these surfaces merge flush with one another as soon as the profile 1 and the intermediate element 8 are joined together, as can be seen in FIG. 6. Adjacent outer walls 11 and 12 of the intermediate element 8, which do not form visible surfaces, are each provided with two receiving holes 13, the positions of which are selected to correspond to the positions of the receiving openings 5 of the profile 1. The receiving holes 13 each extend through the outer walls 11 and 12 into the cavity of the intermediate element 8. The material of the intermediate element 8 is preferably chosen to correspond to the material of the profile 1.

Figure 3:
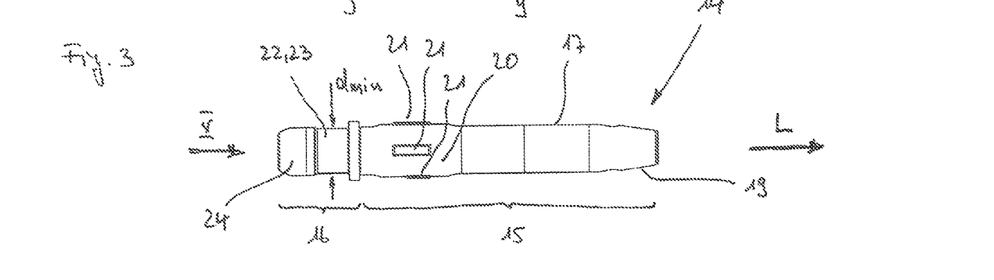
FIG. 3 is a side view of a connecting pin according to one embodiment of the present invention.
Figure 4:
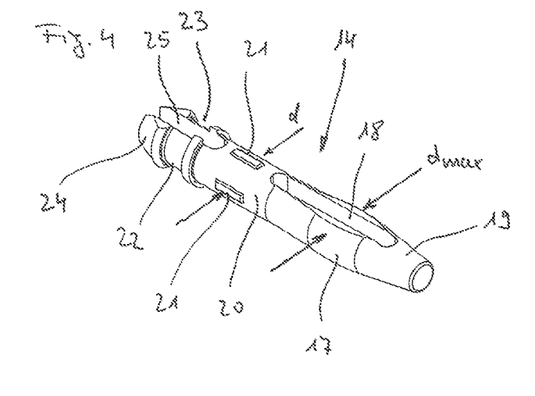
FIG. 4 is a perspective view of the connecting pin shown in FIG. 3.
Figure 5:
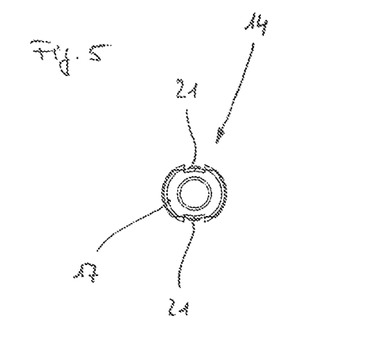
FIG. 5 is an end view of the connecting pin in the direction of arrow V in FIG. 4.

FIGS. 3 to 5 show a connecting pin 14 according to an embodiment of the present invention, which is designed to detachably connect the end face of the profile 1 to the intermediate element 8. The connecting pin 14 comprises a first end portion 15 and a second end portion 16. The first end portion 15 serves to be inserted into the receiving opening 5 of the profile 1. It comprises a radially outwardly curved clamping section 17 of maximum diameter $d_{max}$, which is provided with an elongated recess 18 extending in the longitudinal direction L of the connecting pin 14 and radially therethrough. The dimensions of the clamping section 17 are adapted to the dimensions of the receiving openings 5 of the profile 1 in such a manner that the clamping section 17 can be inserted into a receiving opening 5 while producing a form and force fit. The diameter of the first end portion 15 tapers from the clamping section 17 towards the free end, forming a conical insertion section 19. Furthermore, the first end portion 15 comprises a support section 20 arranged adjacent to the clamping portion 17 and facing the second end portion 16, which support section 20 is provided with support projections 21 arranged spaced apart from each other in the circumferential direction and projecting radially outward. The support projections 21 are preferably elongated and extend in the longitudinal direction L of the connecting pin 14. The outer diameter d of the connecting pin 14 in the region of the support projections 21 is selected to be slightly larger than the diameter of the receiving openings 5 of the profile 1. The second end portion 16 is designed to be inserted into one of the receiving holes 13 of the intermediate element 8. It comprises a receiving section 23 having an annular indentation 22. The minimum diameter $d_{min}$ of the annular indentation 22 is chosen to be equal to the diameter of the receiving holes 13 of the intermediate element 8. The diameter of the second end portion 16 tapers from the receiving section 23 towards the free end, whereby a conical insertion section 24 is also formed here. The second end portion 16 of the connecting pins 14 is further provided in the present case with a groove 25 extending from the free end of the second end portion 16 in the longitudinal direction L of the connecting pin 14 and radially through the latter, which groove 25 preferably extends through the entire second end portion 16 of the connecting pins 14.

To assemble the components shown in FIGS. 1 to 5, two profiles 1 are connected at their end faces using four connecting pins 14 to the intermediate element 8 acting as a corner connector. For this purpose, the first end portions 15 of the connecting pins 14 are each inserted into receiving openings 5 of the profiles 1 and the second end portions 16 of the connecting pins 14 are each inserted into receiving holes 13 of the intermediate element 8. When the first end portions 15 of the connecting pins 14 are inserted into the associated receiving openings 5 of the profiles 1, which is simplified by the conical insertion sections 19, the clamping sections 17 are compressed as soon as they come into contact with the walls of the receiving openings 5, so that sections of the outer surfaces of the clamping sections 17 bear under pressure against the walls of the receiving openings 5. In this way, a form-fit and force-fit is produced simultaneously. The compression of the clamping sections 17 is made possible by the recesses 18. When the first end portions 15 of the connecting pins 14 are pushed further into the receiving openings 5 of the profiles 1, the support projections 21 of the respective support sections 20 then come into contact with the walls of the receiving openings 5, so that these also bear against them under slight pressure. When the second end portions 16 of the connecting pins 14 are inserted into the associated receiving holes 13 of the intermediate element 8, which is also facilitated here by the conical insertion sections 19, pressure is applied manually until the receiving section 23 positively receives the outer wall 11, 12 of the intermediate element 8 surrounding a receiving hole 13. Depending on the diameter of the receiving section 23 on the one hand and the diameter of the receiving holes 13 on the other, a frictional connection can also be achieved if required. In this way, a non-rotatable and detachable connection is achieved between the intermediate element 8 and the profiles 1.

Figure 7:
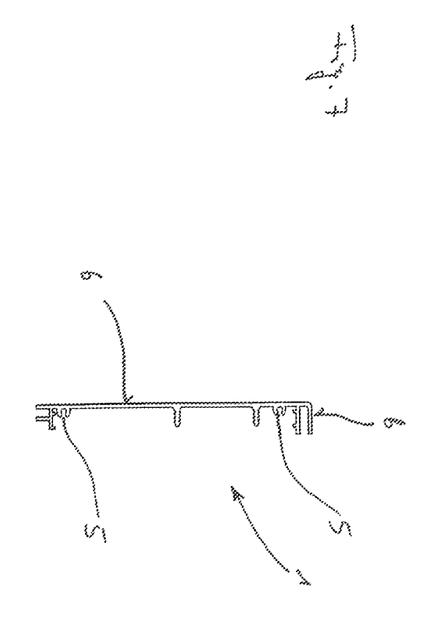
FIG. 7 is a face or end view of a profile according to a second embodiment of the present invention.

FIG. 7 shows a profile 1 according to a second embodiment, which is designed as a channel profile and can be made of steel, aluminum or plastic. The profile 1 has a constant cross-section over its length and is provided with two receiving openings 5 at the end faces, analogous to the profile shown in FIG. 1. It forms two visible surfaces 6 and 7.

Figure 8:
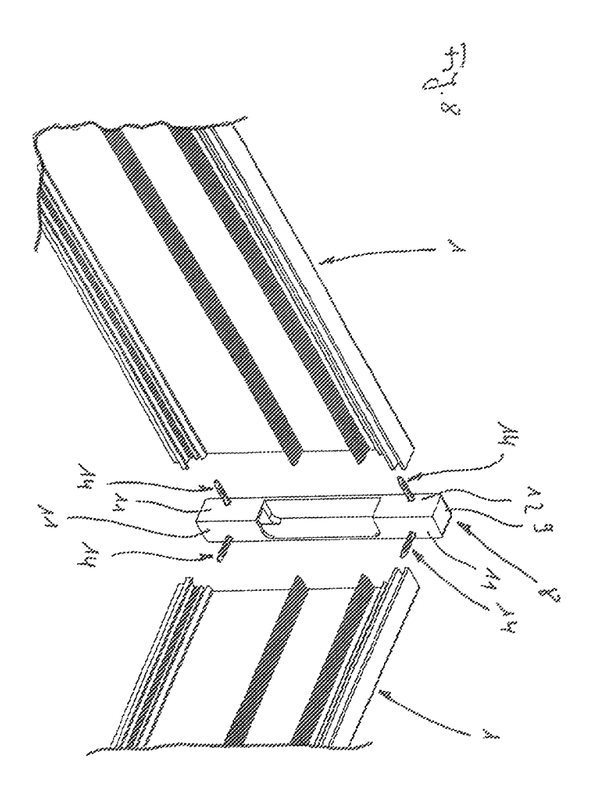
FIG. 8 is a perspective exploded rear view of the components shown in FIGS. 3 to 5 and 7 during assembly using an intermediate element in accordance with a second embodiment of the present invention.
Figure 9:
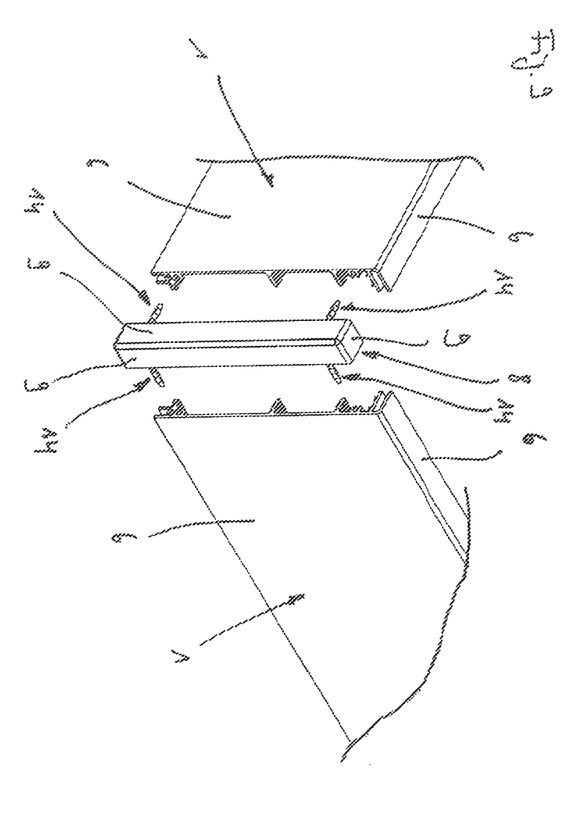
FIG. 9 is a perspective exploded front view of the assembly shown in FIG. 8.

FIG. 8 shows an intermediate element 8 according to a second embodiment of the invention, which is essentially designed as a hollow cuboid with an open underside, wherein three surfaces forming visible surfaces 9. The dimensions of the visible surfaces 9 of the intermediate profile 8 are also adapted here to the dimensions of the visible surfaces 6 of the profile 1 shown in FIG. 7, so that these surfaces merge flush with one another as soon as the profile 1 and the intermediate profile 8 are joined together, as can be seen in FIG. 9. Adjacent outer walls 11 and 12 of the intermediate profile 5, which do not form visible surfaces, are each provided with two receiving holes 13, the positions of which are selected to correspond to the positions of the receiving openings 5 of the profile 1. The receiving holes 13 each extend through the outer walls 11 and 12 into the cavity of the intermediate element 8. The material of the intermediate element 8 is preferably selected to correspond to the material of the profile 1.

FIG. 9 shows, analogously to FIG. 6, how the profile 1 shown in FIG. 7 is connected to the intermediate element 8 shown in FIG. 8 using the connecting pins 14 shown in FIGS. 3 to 5. In this respect, reference can be made here to the corresponding explanations for FIG. 6.

Figure 10:
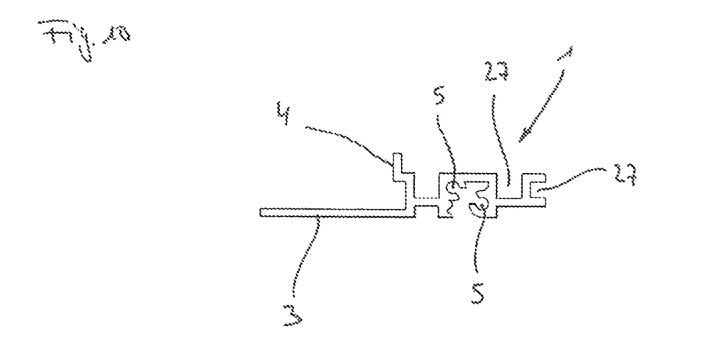
FIG. 10 is an end view of a profile according to a third embodiment of the present invention.

FIG. 10 shows a profile 1 which is a tile end profile used in the staircase area. It can be made of stainless steel, aluminum or plastic. Analogous to the profile 1 shown in FIG. 1, the profile 1 comprises a fastening section 3 provided with punched holes 2 and a contact section 4. Furthermore, a mounting section 26 is provided, which is provided on its upper side and on the end face with receiving grooves 27, which serve to receive fastening projections of a tread made of plastic or rubber, which is not shown here. The profile 1, which apart from the punched holes 2 has a constant cross-section over its length, is provided at the end with two receiving openings 5, which are presently positioned in the mounting section 26.

Figure 11:
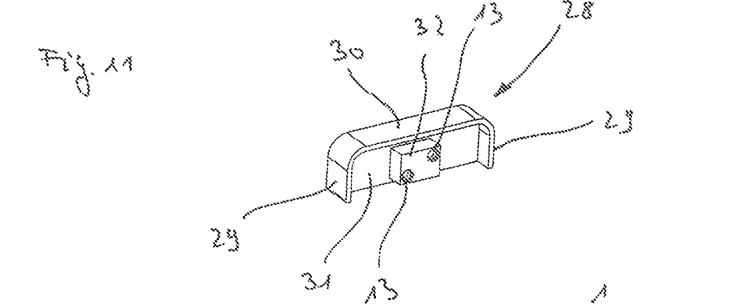
FIG. 11 is a perspective view of an end element according to one embodiment of the present invention.

FIG. 11 shows an end element 28, which serves to visually close off the end of the profile 1. The end element 28 is designed in the manner of a hollow cuboid with an open underside and an open side wall, wherein the corners of the transitions between the end walls 29 arranged opposite one another and the wall 30 forming the upper side being rounded. From the side wall 31, a cuboid-shaped hollow projection 32 projects inwardly, in which two receiving holes 13 are positioned. The positions of the receiving holes 13 again correspond to the positions of the receiving openings 5 of the profile shown in FIG. 10.

Figure 12:
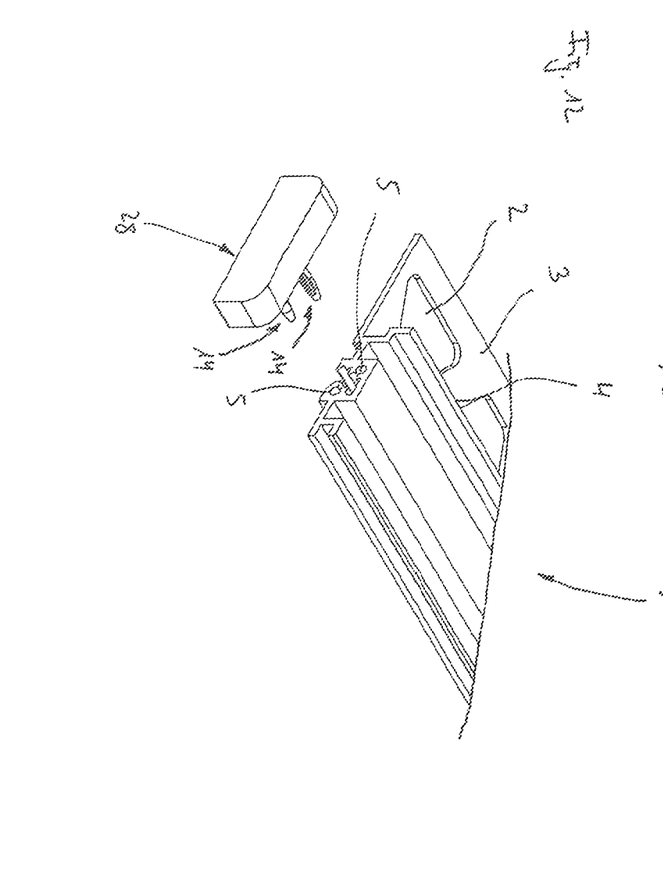
FIG. 12 is a perspective exploded view of the components shown in FIGS. 3 to 5 and FIGS. 10 and 11 during assembly.

FIG. 12 shows how the profile 1 shown in FIG. 10 and the end element 28 shown in FIG. 11 are connected to each other using the connecting pins 14 shown in FIGS. 3 to 5. In this connection, reference is made again to the corresponding explanations regarding FIG. 6.

It will be recognized that embodiments of profile systems in accordance with the invention are not limited to the above-described embodiments, and various modifications may be possible without departing from the scope of the invention as defined in the appended claims.

REFERENCE NUMBERS 1 profile
2 punched hole
3 fastening section
4 contact section
receiving opening
6 visible surface
8 intermediate element
9 visible surface
11 outer wall
12 outer wall
13 receiving hole
14 connecting pin
15 first end portion
16 second end portion
17 clamping section 18 recess
19 insertion section
20 support section
21 support projection
22 indentation
23 receiving section
24 insertion section
25 groove
26 mounting section
27 receiving groove
28 end element
29 end wall
30 side wall
31 side wall
32 projection

The invention claimed is:

1. A profile system, comprising:
a series of elongate profiles (1), which have a constant cross-section over their length, the elongate profiles each having:
a contact section (4) extending along the length of the profile, the contact section having a lateral edge against which end faces of tiles can rest;
the contact section having a face side on which receiving openings (5) are formed for receiving a first end portion (15) of a connecting pin (14), the receiving openings extending into the contact section parallel to the length of the profiles;
a fastening section (3) extending at a 90-degree angle away from the contact section, the fastening section provided with punched holes (2), the punched holes enabling fixing of the profile to a substrate, the fastening section providing a shelf upon which a tile can be installed aside the contact section while the end faces of the tile rest against the lateral edge of the contact section, and
one or more intermediate and/or end elements (8; 28), which are designed to be arranged between profiles (1) or to close the face side of a profile (1); and
connecting pins (14), wherein each connecting pin is a separate part having two end portions (15, 16) and being designed to releasably connect a profile (1) on the face side with an intermediate and/or with an end element (8; 28);
wherein the intermediate and/or end elements (8; 28) comprise receiving holes (13) for receiving the second end portion (16) of a connecting pin (14);
wherein the receiving openings (13) of the intermediate and/or end elements (8; 28) each extend through a wall into a cavity of the intermediate and/or end element (8; 28);
wherein the first end portion (15) of the connecting pins (14) comprises a radially outwardly domed clamping section (17) of maximum diameter, said clamping section (17) being provided with at least one elongate recess (18) extending in longitudinal direction of the connecting pin (14) and radially through the connecting pin (14);
wherein the dimensions of the clamping section (17) are adapted to the dimensions of the receiving openings (5) in such a manner that the clamping section (17) can be inserted into a receiving opening (5) while producing a positive and frictional connection; and
wherein the second end portion (16) comprises a receiving section (23) having an annular wall adjacent an annular indentation (22), the annular indentation bordered by a conical insertion section (24) on one side and the annular wall on an opposing side, wherein the annular wall of the receiving section (23) has an outer diameter adapted to the dimensions of the receiving holes (13) in such a manner that the annular wall of the receiving section (23) is at least positively received within the wall surrounding a receiving hole (13) of an intermediate and/or end element (8; 28), with the conical insertion section of the second end (16) portion hereby extending into the cavity of the intermediate and/or end element (8; 28).

2. The system according to claim 1, wherein the diameter of the first end portion (15) of the connecting pins (14) reduces from the clamping section (17) towards the free end.

3. The system of claim 1, wherein the first end portion (15) of the connecting pins (14) comprises a support section (20) being arranged next to the clamping section (17) and facing towards the second end portion (16), wherein the support section (20) is provided with support projections (21) and said support projections (21) being spaced apart from each other in circumferential direction and protrude radially outwards.

4. The system of claim 3, wherein the support section (20) of the first end portion (15) is arranged directly next to the receiving section (23) of the second end portion (16).

5. The system of claim 1, wherein the diameter of the second end portion (16) of the connecting pins (16) reduces from the annular wall of the receiving section (23) towards the free end.

6. The system of claim 1, wherein the second end portion (16) of the connecting pins (14) comprises a groove (25), said groove (25) extending from the free end of the second end portion (16) in longitudinal direction of the connecting pin (14) and radially therethrough.

7. The system of claim 6, wherein the groove (25) extends through the entire second end portion (16) of the connecting pins (14).

8. The system according to claim 1, wherein the connecting pins (14) are made of plastic material.

9. The system of claim 1, wherein the connecting pins (14) are injection moulded.

10. The system of claim 1, wherein the dimensions of the visible surfaces (6) of the profiles (1) and the dimensions of the visible surfaces (9) of the intermediate and/or end elements (8; 28) are matched to one another in such a manner that they merge flush with one another in the connected state.

11. The system of claim 1, wherein the cross sections of the profiles are each provided on the face side with two receiving openings (5), and that the intermediate and/or end elements (8; 28) are each provided with two correspondingly positioned receiving holes (13) on at least one wall.

12. The system of claim 1, wherein the intermediate and/or end elements (8; 28) are made of the same material.

13. The system of claim 1, wherein the profiles (1) are tile end profiles, profiles accommodating lighting means or cable duct profiles.

14. The profile system of claim 1, wherein the annular indentation (22) extends with a continuous diameter from the annular wall to the conical insertion section (24).

15. A profile system, comprising:
a series of elongate profiles (1), which have a substantially constant cross-section over their length, the elongate profiles each having a fastening section (3) provided with punched holes (2), the punched holes enabling fixing of the profile to a substrate, and a contact section (4) against which end faces of tiles can rest, the fastening section extending at a 90-degree angle away from the contact section and providing a shelf upon which a tile can be installed aside the contact section;

one or more intermediate and/or end elements (8; 28), which are designed to be arranged between profiles (1) or to close the face side of a profile (1); and connecting pins (14), wherein each connecting pin is a separate part having two end portions (15, 16) and being designed to releasably connect a profile (1) on the face side with an intermediate and/or with an end element (8; 28), the connecting pins being fittable within receiving openings and/or holes carried by the profile and/or intermediate and/or end elements; wherein a second end portion (16) comprises a receiving section (23) having an annular wall adjacent an annular indentation (22), wherein the annular wall of the receiving section (23) has an outer diameter adapted to a diameter of the receiving holes (13) in such a manner that the annular wall of the receiving sections (23) is at least positively received within a wall surrounding a receiving hole (13) of an intermediate and/or end element (8; 28), the annular indentation sized to extend through a bore of a receiving hole (13) as the annular wall is received within the wall surrounding the receiving opening.

16. The system of claim 15, wherein the receiving holes (13) of the intermediate and/or end elements (8; 28) each extend through a wall into a cavity of the intermediate and/or end element (8; 28), and wherein the second end portion (16) includes a conical insertion section (24) adjacent the annular indentation (22), the conical insertion section extending into the cavity of the intermediate and/or end elements (8;24) when the annular wall is received within the wall surrounding the receiving hole.

17. The system of claim 15, wherein the first end portion (15) of the connecting pins (14) comprises a radially outwardly domed clamping section (17) of maximum diameter, said clamping section (17) being provided with at least one elongate recess (18) extending in longitudinal direction of the connecting pin (14) and radially through the connecting pin (14).

18. The system of claim 15, wherein the dimensions of a clamping section (17) are adapted to dimensions of the receiving openings (5) in such a manner that the clamping section (17) can be inserted into a receiving opening (5) while producing a positive and frictional connection.

19. The system of claim 15, wherein the first end portion (15) of the connecting pins (14) comprises a support section (20) being arranged next to a clamping section (17) and facing towards the second end portion (16), wherein the support section (20) is provided with support projections (21) and said support projections (21) being spaced apart from each other in circumferential direction and protrude radially outwards.

20. The system of claim 19, wherein the support section (20) of the first end portion (15) is arranged directly next to the receiving section (23) of the second end portion (16).

21. A profile system, comprising:

a series of elongate profiles (1), which have a constant cross-section over their length, the elongate profiles each having a fastening section (3) provided with punched holes (2), the punched holes enabling fixing of the profile to a substrate, and a contact section (4) against which end faces of tiles can rest, the fastening section extending at a 90-degree angle away from the contact section and providing a shelf upon which a tile can be installed aside the contact section;

one or more intermediate and/or end elements (8; 28), which are designed to be arranged between profiles (1) or to close a face side of a profile (1); and connecting pins (14), wherein each connecting pin is a separate part having two end portions (15, 16) and being designed to releasably connect a profile (1) on the face side with an intermediate and/or with an end element (8;28);

wherein the profile cross sections form on a face side of the contact section (4) receiving openings (5) for receiving a first end portion (15) of a connecting pin (14);

wherein the intermediate and/or end elements (8; 28) comprise receiving holes (13) for receiving a second end portion (16) of a connecting pin (14);

wherein the receiving holes (13) of the intermediate and/or end elements (8; 28) each extend through a wall into a cavity of the intermediate and/or end element (8; 28);

wherein the first end portion (15) of the connecting pins (14) comprises a radially outwardly domed clamping section (17) of maximum diameter, said clamping section (17) being provided with at least one elongate recess (18) extending in a longitudinal direction of the connecting pin (14) and radially through the connecting pin (14);

wherein the dimensions of the clamping section (17) are adapted to the dimensions of the receiving openings (5) in such a manner that the clamping section (17) can be inserted into a receiving opening (5) while producing a positive and frictional connection;

wherein the second end portion (16) comprises a receiving section (23) having an annular wall adjacent an annular indentation (22), wherein the annular wall of the receiving section (23) has an outer diameter adapted to a diameter of the receiving holes (13) in such a manner that the wall of the receiving section (23) is at least positively received within the annular wall surrounding a receiving hole (13) of an intermediate and/or end element (8; 28).

* * * * *